April 9, 1935.　　　　　A. W. BUCK　　　　　1,997,557
X-RAY CASSETTE
Filed Jan. 20, 1934　　　　2 Sheets-Sheet 1
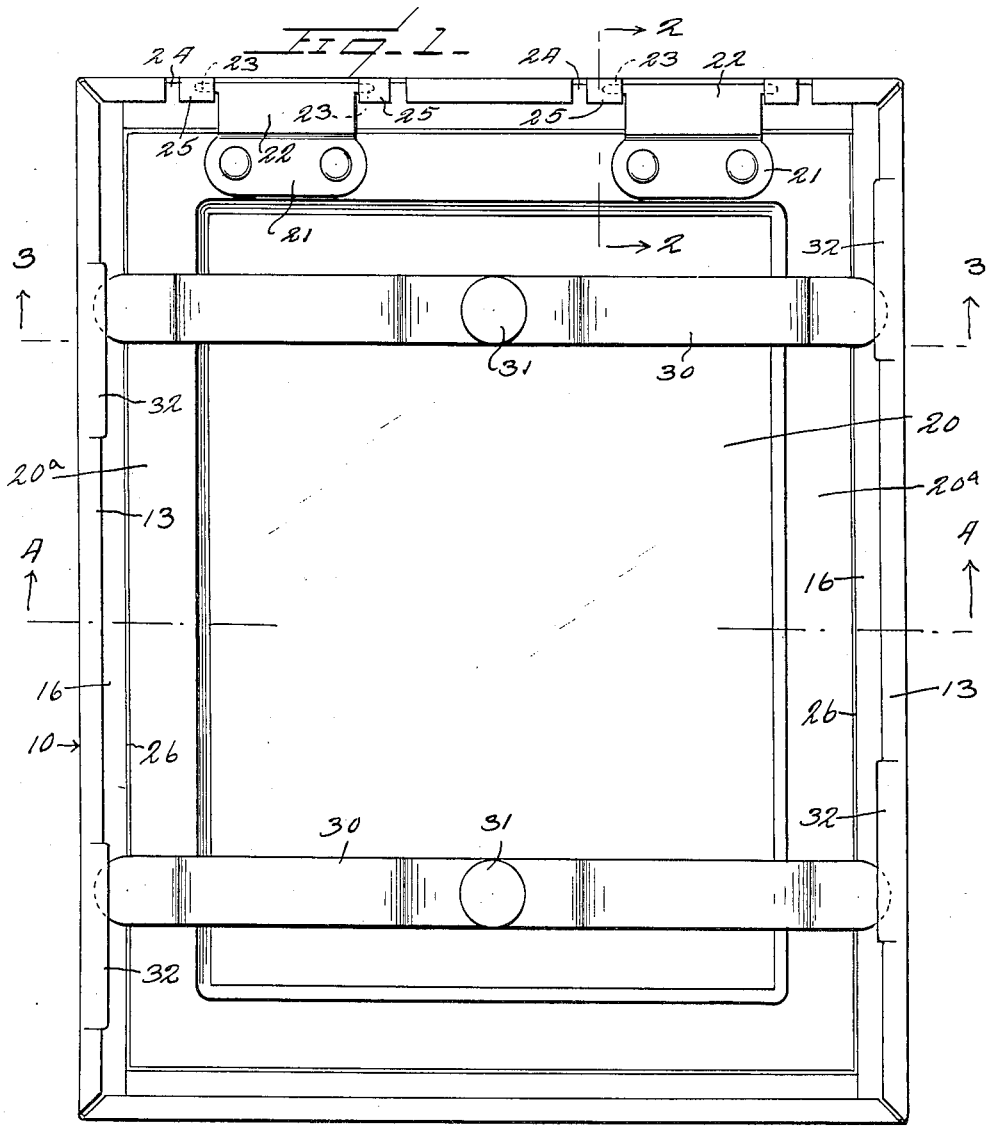
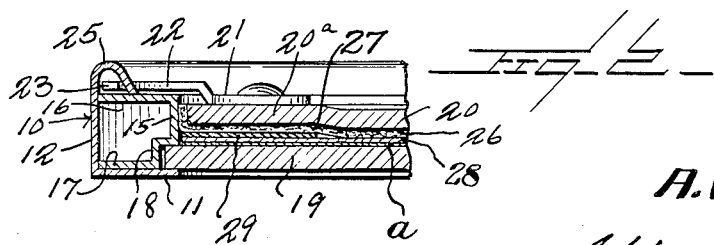
Inventor
A. W. Buck
By Watson E. Coleman
Attorney

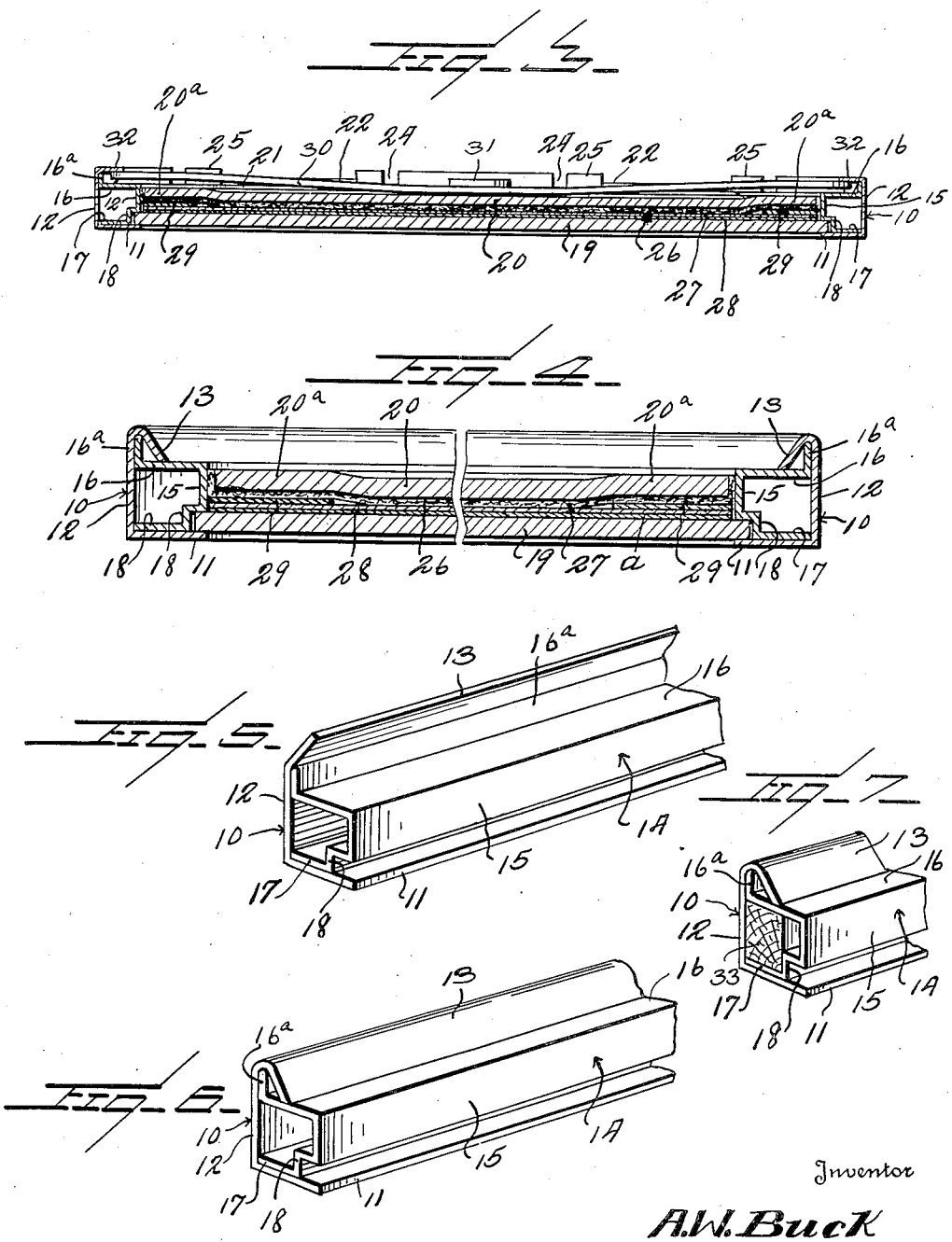

Patented Apr. 9, 1935

1,997,557

UNITED STATES PATENT OFFICE 1,997,557

X-RAY CASSETTE

Arthur W. Buck, St. Louis, Mo., assignor to Buck X-Ograph Company, St. Louis, Mo., a corporation of Missouri Application January 20, 1934, Serial No. 707,591

9 Claims. (Cl. 250—34)

This invention relates to cassettes for holding X-ray films during exposure and particularly this invention relates to the construction of the frame of the cassette, the manner of hinging the cover of the cassette to said frame, and certain details in the construction of the cover.

The frames of cassettes have been heretofore made commonly of an aluminum casting, although originally cassette frames were made of wood. Brass frames are sometimes used but these are heavy and expensive. It is a desideratum that these frames shall be strong and light in weight and so constructed as to retain the correct or accurate alinement of the parts as manufactured.

The general object of my invention is to provide a cassette frame which is lighter than an aluminum cast frame of the same proportions, which is much less easily broken and which retains the alinement of its parts much better than a cast aluminum frame.

A further object is to produce a frame which will not break at the corners as will a cast aluminum frame, which is extremely rigid and will not warp or spring out of alinement, and which is relatively light in weight.

A further object is to provide a frame consisting of an outer section and an inner section, these sections being angular in cross section, and provide means whereby the two sections may be rigidly and easily engaged with each other to form the complete frame.

A further object of this invention is to so form the frame of these two sections that it will retain a sheet of bakelite in position to form the front of the cassette.

Another object is to provide metallic hinges for the cover, in place of the ordinary leather hinges commonly used for this purpose, these metallic hinges being so constructed and so connected to the frame as to permit a slight movement of the cover bodily away from the sheet of bakelite so as to accommodate the thickness of the two intensifying screens ordinarily used and the film.

A further object is to so form the cover that it will accommodate the thickness of the mounting tape or adhesive tape customarily used on all four edges of the cover to hold the intensifying screen in contact with the felt on the cover.

Other objects will appear in the course of the following description.

My invention is illustrated in the accompanying drawings wherein:—

Figure 1 is a rear elevation of a cassette constructed in accordance with this invention, the cover being closed.

Figure 2 is a fragmentary enlarged section on the line 2—2 of Figure 1.

Figure 3 is a transverse section on the line 3—3 of Figure 1.

Figure 4 is an enlarged transverse section on the line 4—4 of Figure 1.

Figure 5 is a fragmentary perspective view of the two sections of the frame before the outer section is clinched over the inner section.

Figure 6 is a like view to Figure 5 but showing the outer section clinched in place.

Figure 7 is a cross section through the frame alone showing a filler strip in place therein.

As will be seen from the accompanying drawings, the outer section of the frame which is designated 10, is bent to form a rectangle. This outer section is angular in cross section, as shown in Figure 5, to provide what may be termed a base flange 11, an edge flange 12 and a clinching flange 13. The inner section, which is designated generally 14, is channel-shaped, generally speaking, to provide an inner edge flange or web 15, the two parallel flanges 16 and 17 and the flange 16a extending at right angles to the flange 16. The sections 10 and 14 are of the same depth but the section 14 at its inner corner, that is, at the junction of the web 15 with the flange 17, is angularly bent at 18 to form with the flange 11 a recess extending entirely around the frame for the reception of the Bakelite sheet constituting a front plate and designated 19 and shown particularly in Figures 3 and 4. The front plate sheet is thus held at its margins entirely around the frame between the flange 11 and the angularly bent portion 18 of the inner frame 14.

It will be seen that with this construction, the inner section is inserted within the outer section and after such insertion, the flange 13 is forced inward to the position shown in Figures 4 and 6, clamping the inner section in place and holding the two sections rigidly engaged with each other. The outer section is cut and welded to the proper size and is welded at all four corners of the frame at the miter joints of the corners. The Bakelite sheet or front plate 19 is then placed in position after which the four pieces which form the two ends and the two sides of the inner section are inserted within the outer section after which the frame is placed within a press and the outer section is clinched, that is, the flange 13 is clinched down against the inner section. The clinching holds the inner section rigidly in place and this clinching action also re-sets or gives the final shape and alinement to the frame, which alinement is retained thereafter making the frame more accurate than is possible with a casting under ordinary conditions.

The cover of the cassette is designated generally 20. This is preferably made of a relatively thin sheet of cast aluminum and has ordinarily a thickness of approximately ⅛ inch. This cover is, of course, of such dimensions that it fits within the inner frame. For the purpose of hinging this cover to the frame of the cassette, I have provided two hinges, each designated 21. These are riveted to the upper end of the cover and have tangs 22 offset outward from the plane of the body of the hinge and provided at their extremities with the laterally projecting trunnions 23. The upper flange 13 is cut away at 24 on each side of each hinge to provide ears 25 which, when the flange 13 is clinched down over the inner frame, are clinched down over the trunnions 23. As shown in Figure 2, a space is left above and below the trunnions so that the trunnions may have a slight movement upward thus permitting the cover to be bodily shifted upward to compensate for the thickness of one or more intensifying screens and for the X-ray film.

The use of rigid metallic hinges is of considerable advantage as heretofore leather hinges have been used, in order to compensate for the thickness of screens, films, etc. and permit the cover to lie flat down against these parts, because leather hinges stretch out of shape, causing the cassette cover to become wobbly. The hinges which I have designed and just described permit sufficient rise and fall to take care of the thickness of the two intensifying screens and film. The inner face of the cover 20 is preferably lined with a very thin sheet or foil of lead designated 26 in Figure 2, which is designed to exclude secondary radiation in making X-ray exposures. Over the face of this cover, there is ordinarily disposed a relatively thick blanket or layer of felt designated 27 which extends up and around the edges of the cover and against the inner face of this felt covering, there is disposed an intensifying screen of well known character which is designated 28. For the purpose of holding this screen in place against the felt, adhesive tape is ordinarily used designated 29, this tape being disposed around the margin of the felt and bearing against the felt on one side and against the screen on the other. In order to accommodate this tape and have a perfectly even surface for the screen, I form the cover as illustrated in Figures 3 and 4 and also in Figure 1, with a marginal portion 20ª which is depressed relative to the central portion of the cover, that is, which is forced outward relative to the central portion of the cover and away from the Bakelite sheet 19. This depression of the margin of the cover is very slight and only just sufficient to compensate for the thickness of the tape 29. If the recess or depression 20ª were omitted, the thickness of the mounting tape or adhesive would result in undue pressure on the edges of the screen when the cassette was closed, which would be oftentimes injurious to the screens. The principal reason, however, for this recessing or depressing of the margin of cover 20ª is that otherwise the screen being raised around the edges by the tape or adhesive would prevent perfect contact between the screen 28, the film a, and the back plate 19, or if two screens are used, between the upper and lower screen and the film disposed between the two screens. In the drawings only one intensifying screen 28 is shown but it is to be understood that two may be used if desired, as is common in X-ray cassettes.

It will be seen that by this construction, I have provided a frame which is particularly rigid and strong and which in its process of manufacture is brought into the form of a perfectly true rectangle when the two sections or elements of the frame are clinched to each other, and it will further be seen that the hinges of the cover may be secured to the frame at the same time that the two sections of the frame are being clinched or that the ears 25 may be forced downward over the trunnions of the hinge after the two sections of the frame have been clinched to each other. Inasmuch as the frame is hollow, it may be made very light and inasmuch as it is formed of angular sections, it is particularly strong.

While I have illustrated a Bakelite sheet 19, it is to be understood that any other material transparent to X-rays may be used in place of this sheet. With regard to the hinge formed of the parts 21 and 22, it is to be noted that while I have illustrated two hinges, that under certain circumstances and where the cassette is small, only one hinge need be used, this hinge being relatively wide. Furthermore, the cover may be hinged either at the side to the frame or at the end to the frame. The hinge construction illustrated has a big advantage in that not only does the hinge permit bodily movement of the cover a slight distance toward or from the Bakelite sheet to accommodate different thicknesses of screens, films, etc. and variations in the thickness of these parts, but the hinge permits the cover to be turned back through an angle of 180°. Other hinges known to me, except leather hinges, do not permit the cover to be turned back through this 180° but restrict the movement of the cover to an angle of 90°. If the cover is limited to a movement of 90°, there is always a tendency for the cover to fall shut at the wrong time and, furthermore, the opening of the cover tends to strain the hinge and this calls for frequent repair.

While I have illustrated the inner frame as being hollow, it is to be understood that a filler 33 of light material as, for instance, light wood, might be disposed within the inner frame so it will not crush down when the flange of the outer frame is clinched down onto the face of the inner frame. This is not absolutely necessary but desirable. This is illustrated in Figure 7 but is omitted from the other figures for clearness.

The cover is, of course, held closed against the film, the intensifying screens and the Bakelite front plate by means of the springs 30 pivoted at 31 to the cover and engaging under lips 32 formed by depressing the flanges 13 of the outer section where the springs are to engage. This is shown in Figures 1 and 3.

Having described my invention, what I claim is:—

1. In a cassette, a frame formed of an outer section and an inner section to provide a front face, a rear face and an outer edge face and an inner edge face, the inner section on its inner edge face being recessed to provide between it and the outer section a groove extending entirely around the frame, a sheet of composition having its margin disposed within said groove and a cover adapted to fit within the frame and confront the composition sheet.

2. A cassette, including a rectangular frame formed of an inner section and an outer section, both sections being metallic, the outer section being angular in cross section and the inner section being channel-shaped and fitting within the outer section and rigidly engaged therewith, the inner section at one corner being deformed to provide a recess between the inner section and the adjacent flange of the outer section, the recess extending entirely around the frame, a front plate carried within said recess, and a cover hinged to the frame and fitting within the same and confronting the front plate.

3. A cassette, including a frame formed of an inner metallic section and an outer metallic section, the inner metallic section being channel-shaped in cross section, the outer section being angular in cross section to receive the inner section, the outer section having a flange bent downwardly and clinched against the rear face of the inner section, said flange at one end of the outer section being formed to provide one or more opposed pairs of hinge beads, a metallic cover adapted to fit within the frame having attached to one end thereof metallic hinge plates each formed with an outstanding tang, the tang at its extremities having laterally projecting trunnions adapted to be engaged within the corresponding pairs of beads and a front plate supported by said frame.

4. A cassette, including a frame formed of an inner metallic section and an outer metallic section, the inner metallic section being channel-shaped in cross section, the outer section being angular in cross section to receive the inner section, the outer section having a flange bent downward and clinched against the rear face of the inner section, said flange at one end of the outer section being formed to provide one or more opposed pairs of hinge beads a metallic cover adapted to fit within the frame having attached to one end thereof metallic hinge plates each formed with an outstanding tang, the tang at its extremities having laterally projecting trunnions adapted to be engaged within the corresponding pairs of beads, the bears projecting outward sufficiently to permit bodily movement of the trunnions toward or from the opposite face of the frame and a front plate supported by said frame.

5. In a cassette, a frame, a cover therefor and a front plate, the inner face of the margin of the cover being recessed, a layer of felt attached to the inner face of the cover, the recess in the margin of the cover permitting an adhesive tape to be used to connect an intensifying screen to the felt layer and permitting the intensifying screen to lie parallel to the central portion of the cover throughout its entire area.

6. A cassette, including an inner member, the member being channel-shaped in cross section, the open side of the channel extending outward, one side of the member having a flange extending at right angles from the plane of the side, and an outer member extending along one side of the inner member, then across the open side of the inner member, then extending around and over the flange of the inner member and clinched against the adjacent side of the member, the outer and the inner member together defining a frame, the cassette having a cover fitting within the frame, the frame supporting a front plate.

7. A cassette, including a frame, a cover, and a front plate fitting within the frame, the frame being formed of an inner section and an outer metallic section, the inner section being inserted within the outer section and having a flange extending parallel to the outer wall of the outer section, the outer wall of the outer section extending beyond said flange and being bent over the edge thereof and clinched against the adjacent face of the inner section.

8. A cassette, including a frame, a cover and a front plate fitting within the frame, the frame being formed of an outer metallic section and an inner metallic section, the inner section being channel-shaped in cross section and disposed with its open side outward and having a flange extending at right angles to a side wall of the channel-shaped section, the outer section being right angular in cross section, the inner section being received within the outer section, one wall of the outer section extending beyond the flange on the inner section and being bent over said flange into edge contact with the adjacent face of the inner section.

9. A cassette, including a rectangular frame, a cover and a front plate fitting within said frame, the frame being formed of an inner section and an outer section, the outer section being angular in cross section and being bent into a rectangle and welded at the corners of the rectangle, the inner section being formed of four pieces, each of said pieces being channel-shaped in cross section, the open sides of the pieces of the inner section being disposed to confront the outer walls of the outer frame section, the pieces of the inner section having at the edge of one wall an outstanding flange bearing against the outer wall of the outer section, this outer wall extending beyond the edge of said flange being bent over the flange and clinched against the inner section.

ARTHUR W. BUCK.